Patented Nov. 2, 1937

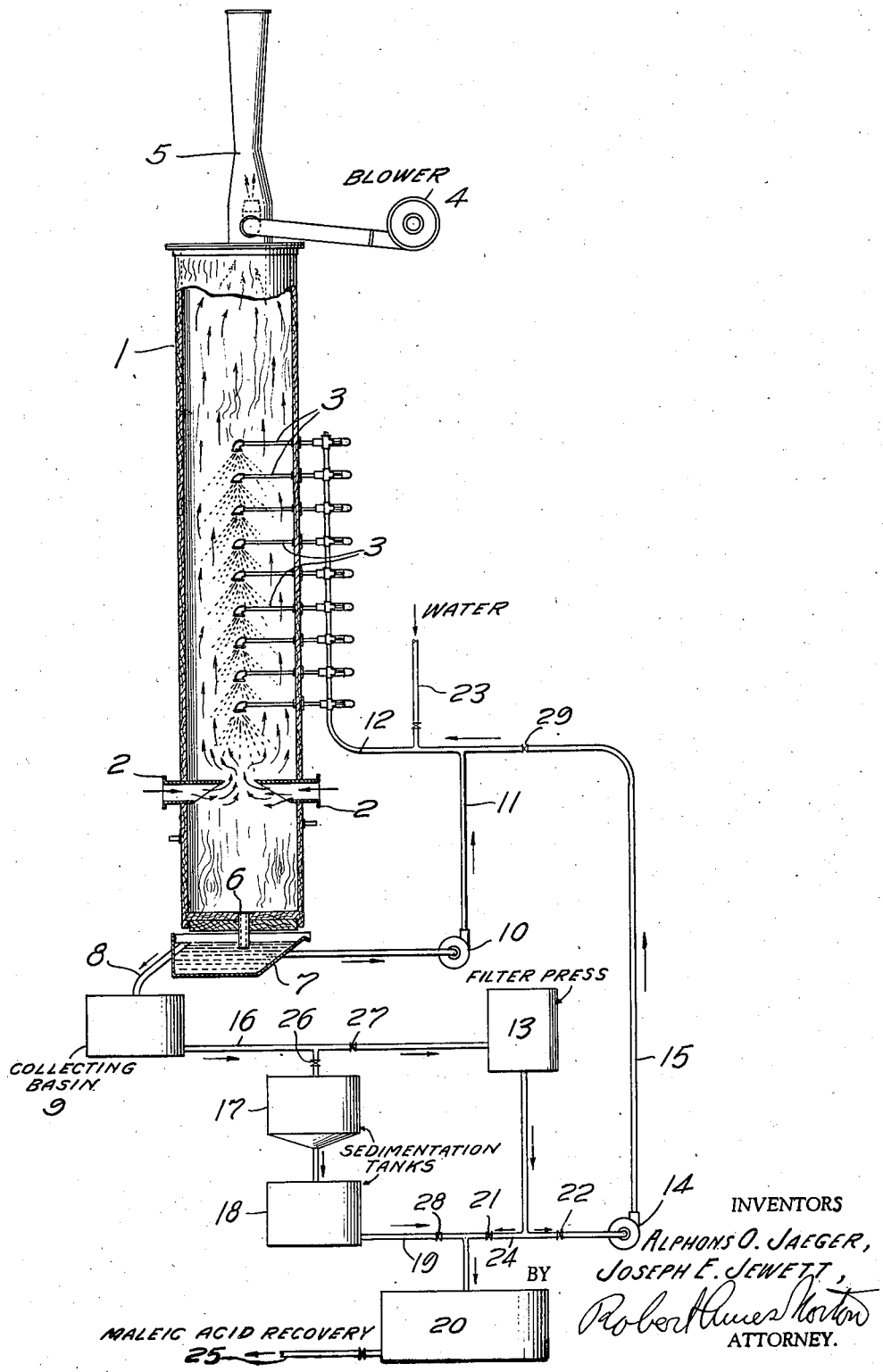

2,098,047

UNITED STATES PATENT OFFICE 2,098,047

PROCESS OF RECOVERING MALEIC ACID FROM THE FUME GASES CONTAINING SMALL AMOUNTS THEREOF

Alphons O. Jaeger, Greentree, and Joseph E. Jewett, Pittsburgh, Pa., assignors to American Cyanamid & Chemical Corporation, Bridgeville, Pa., a corporation Application November 21, 1935, Serial No. 50,839

11 Claims. (Cl. 260—122)

This invention relates to the recovery of maleic acid from the exhaust gases produced in the vapor phase catalytic oxidation of naphthalene to phthalic anhydride and similar vapor phase oxidations of organic compounds containing conjugated double bonds.

When naphthalene or similar aromatic compound is oxidized catalytically a certain amount of maleic acid is produced in addition to the primary product, thus, for example, in the case of naphthalene while the primary product is phthalic anhydride there is always a considerable percentage of maleic acid produced which will vary with the nature of the catalyst and which can also be increased by the addition of certain compounds which oxidize directly to maleic acid, such as benzene, phenol, cresols, furane bodies, and the like. In the catalytic oxidation of benzene and phenols, maleic acid is produced directly as the primary product. The vapor from a converter in a vapor phase catalytic oxidation plant is normally led through condensers where the major portion of the primary product is condensed as a solid. Maleic anhydride being relatively volatile passes through the condensers which are maintained at a regulated, sufficiently high temperature to condense relatively pure primary product and has to be washed out of the gases as it otherwise produces a severe fume nuisance. Even where benzene, phenols or similar compound are directly oxidized to maleic anhydride there is also a considerable loss in the exhaust gas due to the volatility of the anhydride.

In the past, the fume nuisance which arose from escape of maleic anhydride into the atmosphere necessitated the scrubbing of the gases in so-called fume towers. The scrubbing is by water-spray or spray of dilute alkali. In either case, a dilute solution of maleic acid or its salts was produced and allowed to run to waste because it cost more to recover the maleic acid from the dilute fume tower liquor than it does to produce maleic acid directly. In view of the great corrosiveness of maleic acid (it is one of the strongest organic acids and is comparable to hydrochloric acid in its corrosiveness) the discharge of the fume tower liquor presented a considerable nuisance.

The present invention permits the recovery of maleic acid by producing a concentrated liquor maleic acid by producing a concentrated liquor from the fume towers from which maleic acid can be economically recovered. Essentially the present invention depends on the use of maleic acid liquor as a spray instead of water or alkali solution. Surprisingly as it may seem, even relatively concentrated maleic acid liquor will effectively scrub exhaust gases from a condenser such as a phthalic anhydride condenser. It had been thought that water had to be used or even an alkali in order to effect sufficiently rapid solution of the maleic acid from the vapors so that the fume nuisance could be abated and that the use of a relatively concentrated liquor as a spray would not be suitable. We have found, on the contrary, that concentrated spray liquor which can be circulated, and of any strength, can be used provided a sufficient amount of spray is employed and provided that sufficient time of exposure to the gases is obtained.

Any suitable gas and liquid contact apparatus may be used in the place of fume towers. Thus, for example, packed towers, self circulating gas contacters, roll spray chambers, Feld gas washers, and the like may be employed. In some of these devices there is a continuous circulation of liquor. In others, the liquor is agitated by the passage of the gas therethrough, and there is no definitely defined circulation path. The main essential is a sufficient time of contact between the maleic acid liquor and the vapors to provide for satisfactory solution of maleic acid. When fume towers are used, the invention is preferably carried out by recirculating the liquor from the tower through spray nozzles or other distributors in the tower until a sufficient concentration of maleic acid has been built up, for example, from 25 to 50%, depending on the nature of the gases, temperature, etc., and then continuously or intermittently removing a portion of the liquor from the circuit, replacing it with water, dilute maleic acid liquor to be concentrated, or the like. By this recirculation a given volume of liquid is brought into contact with the gases many times and is therefore given sufficient time to collect the necessary maleic acid since it is called upon each recirculation only to dissolve a relatively small amount of maleic acid whereas to obtain comparable strengths by the old water-spray method it would be necessary to build a tower of such enormous height as to be economically impossible.

In the modification using fume towers, the present invention is particularly concerned with the direct recirculation of the liquor leaving the fume tower, but in more specific aspects it includes compound recirculation with filtration. This is of special value where the exhaust gases contain considerable quantities of solids which form a sludge or contain such large amounts of phthalic acid as to create a problem of precipitation of phthalic acid crystals in the liquor which would seriously plug distributors such as spray nozzles, packing, etc. Where such difficulties are encountered, part or all of the liquor flowing from the tower may be subjected to filtration or settling, or both, removing solid impurities and part or all of the filtered liquor can be re-introduced into the recirculation in the tower. This permits a sufficiently rapid removal of liquid from the tower circuit to prevent clogging through solids without correspondingly lowering the concentration of maleic acid in the liquor so removed which would be the case if the entire makeup were water.

The invention will be described in conjunction with a modern spray fume tower from a phthalic anhydride plant. The invention is, however, not limited to this type of apparatus and any suitable gas and liquid contact apparatus may be used. It is an advantage of the present invention that it is not limited to particular special apparatus, although it has been found that fume towers of the type shown in the drawing give extraordinarily effective results with very economical apparatus cost and in a more specific aspect the improved apparatus is also included in our invention.

The specific description of the invention is to be taken in conjunction with the drawing which shows in semidiagrammatic form a fume tower system employing the present invention. The view is a front elevation with the fume tower partly in section.

Exhaust vapors from a condenser from a vapor phase phthalic anhydride plant enter the fume tower 1 through the ducts 2 which are placed so as to produce a turbulent flow of vapors in the tower. The vapors ascend the tower countercurrent to a spray of maleic acid liquor from a series of spray nozzles 3, suction being provided by the blower 4 and venturi 5 on top of the tower. The liquor which scrubs the vapors removing maleic anhydride, a portion of the phthalic anhydride and other soluble constituents together with dust and similar insoluble solids, leaves the bottom of the tower through the pipe 6, flowing into an overflow basin or sump 7, from which it is continuously pumped by the pump 10 through the pipe 11 into the manifold 12 which feeds the sprays 3. Makeup water when necessary is introduced through the valved pipe 23. The excess liquor overflows from the sump 7 through the overflow 8 into a collecting basin 9, whence it flows to a filter press 13 where solids are removed and the filtrate passes into the pipe 24, part of it flowing into the filtered maleic acid liquor storage tank 20 and part being pumped by the pump 14, through the pipe 15, into the manifold 12. The relative proportion flowing into the tank 20 and into the pump 14 is determined by adjustment of the valves 21 and 22 in the pipe 24. If desired, the whole of the filtered liquors may be recirculated during certain periods. From the tank 20 the filtered liquor may be drawn off through the valved pipe 25 to a maleic acid recovery system.

In the filter press mud and crystals of phthalic acid or other materials scrubbed out by the spray but less soluble than maleic acid are removed and if the proportion of phthalic acid is sufficiently high the filter cake may be treated for recovery of the values.

Where the amount of solids is not sufficiently great to give trouble in the spray nozzles or where the solids are in such fine suspension as not to clog orifices the filter 13 may be dispensed with and the liquor from the collecting tank 9 permitted to flow through the pipe 16 into a sedimentation tank 17, from which it is decanted into a second sedimentation tank 18 and flows through the pipe 19 into the tank 20.

Normally the character of the gases to be handled by the system will determine whether a filter press or sedimentation is to be used. Sometimes, however, it is desirable to provide both so that one system or the other or both together may be used. This is indicated in the drawing by the valves 26 and 27 in the pipe 16 and the pipe leading to the filter press 13. In some cases where it is not desired to recover highly purified maleic acid, both sedimentation and filter press may be dispensed with, but normally a removal of solids in the system is desirable.

Because of the highly corrosive nature of the maleic acid liquor, corrosion resistant construction must be used thus, for example, the fume towers may be of wood and suitable corrosion resisting pipes and spray nozzles should be employed.

The drawing illustrates the application of the present invention to a single fume tower. Where a battery of fume towers are available the connections may, of course, be suitably paralleled and, in general, the present invention is adaptable to almost any design of scrubbing equipment.

In the drawing, water is shown as added to the system and in some form or other, of course, water must be added because water is being withdrawn from the system into the tank 20. In certain installations, however, there is available dilute maleic acid liquor from other sources, for example, certain low grade portions of the solid phthalic anhydride obtained in the condensers may be leached with a restricted amount of water to produce a maleic acid liquor or a dilute maleic acid liquor may be obtained from some other process in the plant such as, for example, the fume towers from sublimers for purifying phthalic anhydride where the amount of maleic acid present is sufficient to warrant their use and where, of course, by reason of the lower concentration of maleic anhydride a more dilute liquor will be obtained. Such liquor can, of course, replace the make up water and it is an advantage of the present invention that it can be used to concentrate otherwise valueless liquor as well as to obtain from the gases a satisfactory strength of liquor in the first place. In addition to producing a concentrated maleic acid liquor, the present invention also effects a partial purification because the aeration taking place through repeated or long-continued contact of the liquor with air tends to coagulate certain impurities in the maleic acid liquor and transform them into such a form that they may be removed by filtration or sedimentation. We do not claim the aeration of maleic acid liquor per se in the present application, this constituting the subject matter of our copending application Ser. No. 50,838 filed Nov. 21, 1935 but it is an advantage of the present invention that a partial purification by aeration takes place by reason of the very steps of the process itself. In other words, in a single step the present invention effects enrichment of the maleic acid liquor, scrubbing of the vapors and a partial purification of the maleic acid liquor by contact with oxygen containing gases.

We claim:

1. A method of producing a concentrated maleic acid liquor from effluent gases containing maleic anhydride in the concentrations normally obtained in the fume gases from catalytic vapor phase organic oxidation plants, which comprises scrubbing the gases with a maleic acid liquor to produce a liquor of the desired concentration.

2. A method of producing a concentrated maleic acid liquor from effluent gases containing maleic anhydride in the concentrations normally obtained in the fume gases from catalytic vapor phase organic oxidation plants, which comprises scrubbing the gases with maleic acid liquor, withdrawing the liquid produced, recirculating at least a portion thereof and drawing off a portion of the liquor thus produced.

3. A method of producing a concentrated maleic acid liquor from the maleic anhydride containing effluent gases from the condensers of a vapor phase catalytic oxidation plant of aromatic compounds, which comprises scrubbing the exhaust gases from the condenser which contain maleic anhydride in the concentrations normally obtained in the fume gases from catalytic vapor phase organic oxidation plants with a dilute maleic acid liquor, thereby concentrating the liquor, continuously removing the concentrated liquor from the zone of scrubbing, recirculating at least a portion thereof and withdrawing a portion of the concentrated liquor from the circuit.

4. A method according to claim 3 in which the vapor phase catalytic oxidation plant is a plant in which an aromatic compound containing a major portion of naphthalene is oxidized to phthalic anhydride.

5. A method according to claim 3 in which the vapors from the condensers are passed upwardly in countercurrent to a spray of maleic acid liquid and a suction inducing means is employed in a portion of the gas flow above the sprays of maleic acid liquor.

6. A method of producing a concentrated maleic acid liquor from the maleic anhydride containing effluent gases from the condensers of a vapor phase catalytic oxidation plant of aromatic compounds, which comprises scrubbing the exhaust gases from the condenser which contain maleic anhydride in the concentrations normally obtained in the fume gases from catalytic vapor phase organic oxidation plants with a dilute maleic acid liquor, thereby concentrating the liquor, continuously removing at least a portion thereof and withdrawing a portion of the concentrated liquor from the circuit, clarifying the withdrawn portion by separation of solids therefrom and reintroducing a portion of the clarified product into the scrubbing circuit.

7. A method according to claim 6 in which the vapor phase catalytic oxidation plant is a plant in which an aromatic compound containing a major portion of naphthalene is oxidized to phthalic anhydride.

8. A method of producing a concentrated maleic acid liquor from the maleic anhydride containing effluent gases from the condensers of a vapor phase catalytic oxidation plant of aromatic compounds, which comprises scrubbing the exhaust gases from the condenser which contain maleic anhydride in the concentrations normally obtained in the fume gases from catalytic vapor phase organic oxidation plants with a dilute maleic acid liquor thereby concentrating the liquor, continuously removing the concentrated liquor from the zone of scrubbing, recirculating at least a portion thereof and withdrawing a portion of the concentrated liquor from the circuit, filtering the withdrawn portion to separate out solids and reintroducing a portion of the filtrate into the scrubbing circuit.

9. A method according to claim 8 in which the vapor phase catalytic oxidation plant is a plant in which an aromatic compound containing a major portion of naphthalene is oxidized to phthalic anhydride.

10. A method of producing a concentrated maleic acid liquor from the maleic anhydride containing effluent gases from the condensers of a vapor phase catalytic oxidation plant of aromatic compounds, which comprises scrubbing the exhaust gases from the condenser which contain maleic anhydride in the concentrations normally obtained in the fume gases from catalytic vapor phase organic oxidation plants with a dilute maleic acid liquor, thereby concentrating the liquor, continuously removing the concentrated liquor from the zone of scrubbing, recirculating at least a portion thereof and withdrawing a portion of the concentrated liquor from the circuit, clarifying the withdrawn portion by subjecting to sedimentation and reintroducing a portion of the clarified liquid into the scrubbing circuit.

11. A method according to claim 10 in which the vapor phase catalytic oxidation plant is a plant in which an aromatic compound containing a major portion of naphthalene is oxidized to phthalic anhydride.

ALPHONS O. JAEGER.
JOSEPH E. JEWETT.